UNITED STATES PATENT OFFICE.

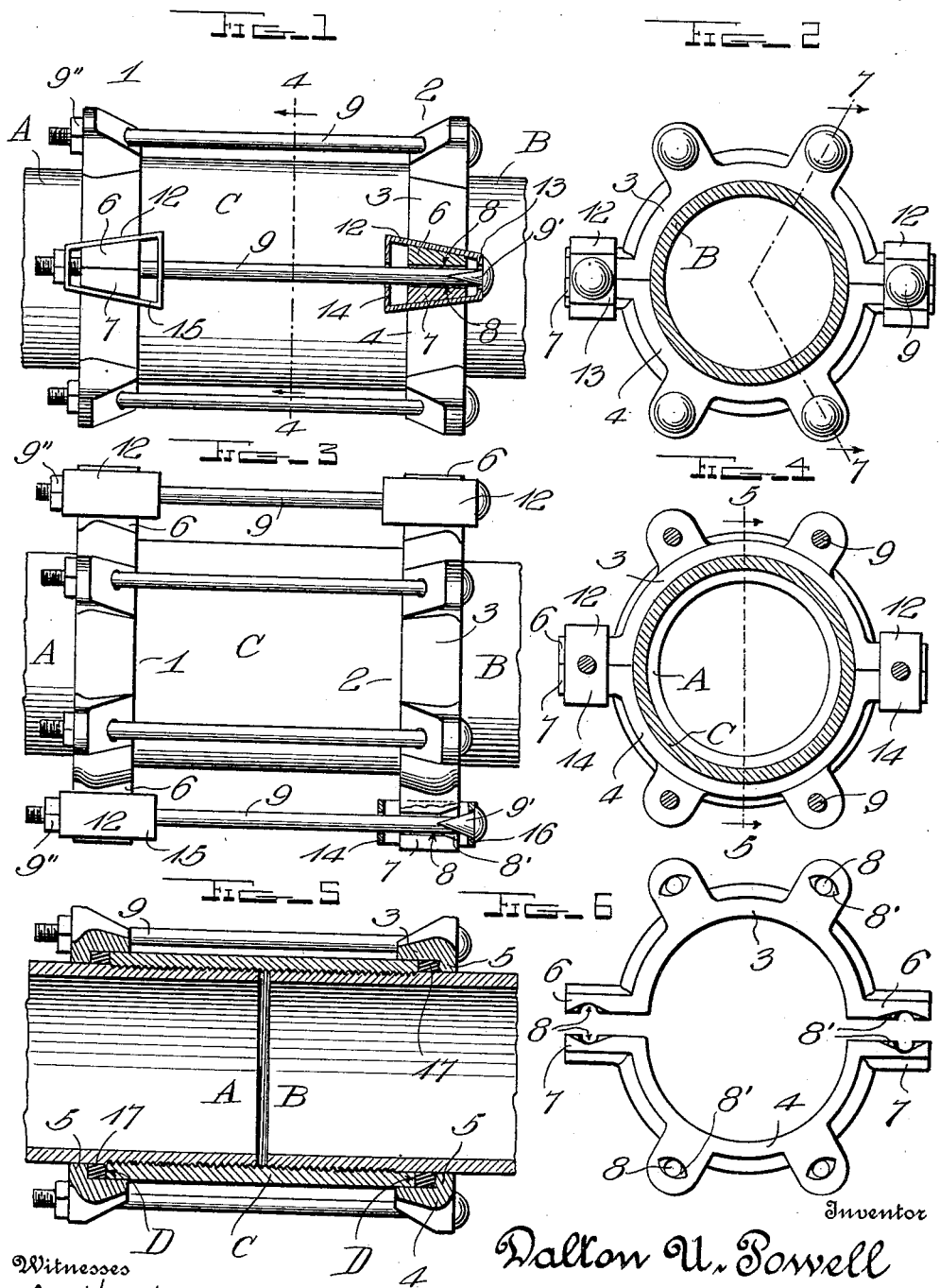

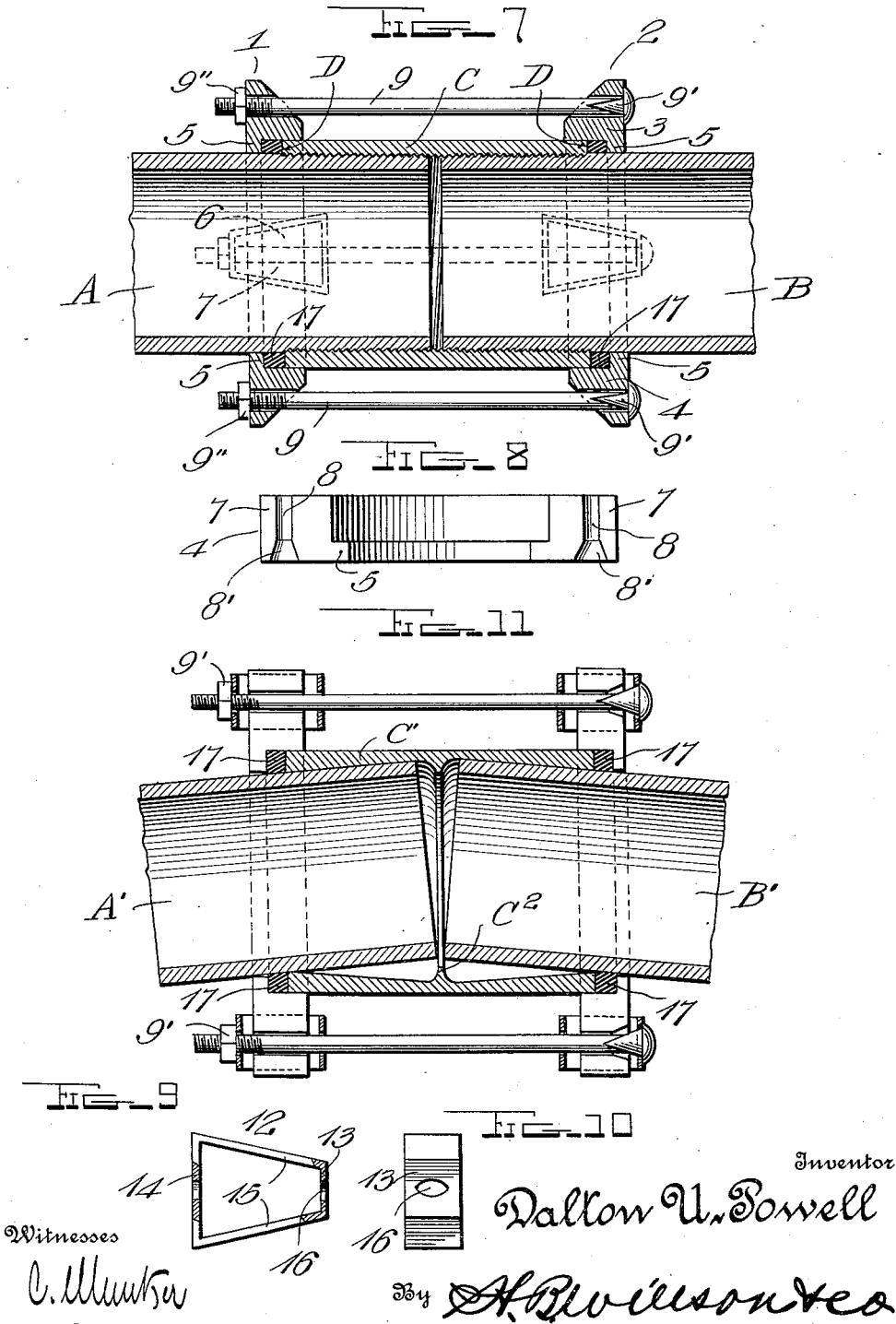

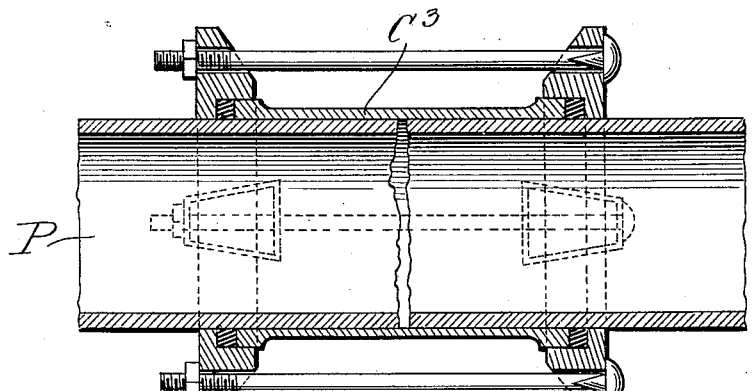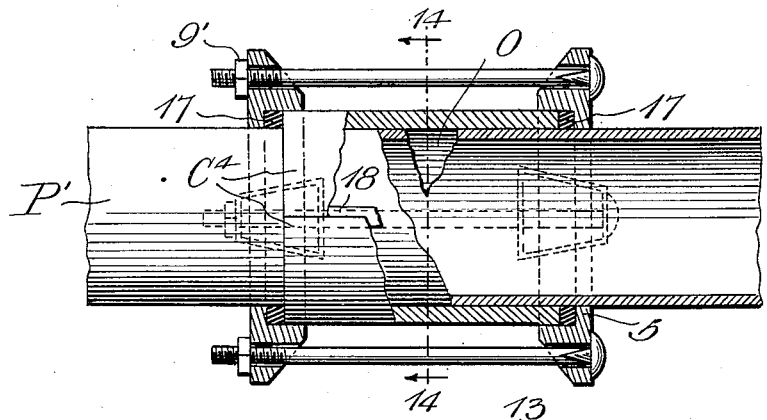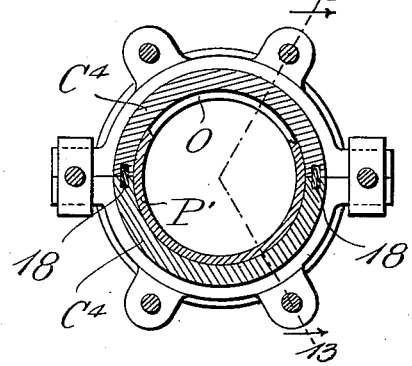

DALTON U. POWELL, OF BARNESVILLE, OHIO.

COMBINATION LOCK-COUPLING.

1,098,299. Specification of Letters Patent. Patented May 26, 1914.

Application filed October 7, 1913. Serial No. 793,878.

*To all whom it may concern:*

Be it known that I, DALTON U. POWELL, a citizen of the United States, residing at Barnesville, in the county of Belmont and State of Ohio, have invented certain new and useful Improvements in Combination Lock-Couplings; and I do declare the following to be a full, clear, and exact description of the invention, such as will enable others skilled in the art to which it appertains to make and use the same.

This invention relates to a combination lock coupling for pipes.

The object of the invention is to provide a simple and effective device of this character capable of a variety of uses, and which will simultaneously compress a packing both transversely and longitudinally, relatively to the pipe to which it is applied. This device is designed for stopping and preventing leaks which may occur in pipes and pipe lines, and for connecting the meeting ends of pipe sections fluid tight, and which is also equipped with means for locking the coupling sections against accidental separation when the connecting bolts are removed.

With these and other objects in view, the invention consists of certain novel features of construction, and the combination and arrangement of parts, as will be more fully described and claimed.

In the accompanying drawings:—Figure 1 represents a side elevation partly in section of a portion of two pipe sections showing this improved combination coupling applied. Fig. 2 is an end view thereof with the pipe shown in transverse section. Fig. 3 is a plan view with parts broken out. Fig. 4 is a central transverse section taken on the line 4—4 of Fig. 1. Fig. 5 is a longitudinal section taken on line 5—5 of Fig. 4. Fig. 6 is an end view of two of the ring sections showing them separated. Fig. 7 is a longitudinal section taken on the line 7—7 of Fig. 2. Fig. 8 is a plan view of one of the ring sections. Fig. 9 is a side elevation partly in section of one of the locking or actuating yokes. Fig. 10 is an end view thereof. Fig. 11 is a plan view partly in section showing another application of this improved coupling. Fig. 12 is a longitudinal section showing still another application. Fig. 13 is a similar view taken on the line 13—13 of Fig. 14. Fig. 14 is a transverse vertical section taken on the line 14—14 of Fig. 13.

In the embodiment of the invention illustrated in Figs. 1 to 10, this improved lock coupling is shown applied to the meeting ends of two pipe sections A and B to be connected, and which are encircled by a ring member or sleeve C having squared ends D.

The coupling which constitutes this invention comprises two clamping rings or follower heads 1 and 2, each being split to form complementary members which are similar in construction, and hence one only will be described in detail.

The split members or sections 3 and 4 of each ring are semi-circular in shape and are shouldered at one edge to form when the sections are assembled in operative position, an annular inturned flange or shoulder 5 for a purpose to be described. These sections are also each provided at their opposite ends with outwardly projecting laterally extending arms 6 and 7, one face of each arm being arranged flush with the ends of the section and forming a continuation thereof, so that when the two sections are brought together, they form a continuous ring having oppositely disposed lateral bolt receiving members. These arms are tapered transversely from one edge to the other to form, in conjunction with the adjacent arms on the other section, when the sections are in operative position, wedge-shaped members for coöperation with actuating yokes to be described. Each of these arms 6 and 7 of both sections has a recess or notch 8, those in the arms of one section being arranged to register with those in the arms of the complementary section to form bolt openings having seats 8', and through which bolts are adapted to extend for connecting the two clamping rings 1 and 2, these bolts being provided with lateral wings 9', adapted to seat in the seats 8', and thus prevent the turning of the bolts.

The bolts 9 pass through the holes in the arms of the two rings 1 and 2 and are provided with tightening nuts 9" which when turned inwardly serve to draw the rings 1 and 2 toward each other, being held against turning by the wings 9', engaging the seats 8'.

Actuating yokes 12 constructed as shown in detail in Figs. 9 and 10 are designed for use in connection with the arms of the rings 1 and 2, these yokes being provided with a cross bar 13 at one end which is shorter than the cross bar 14 at the other end, thereby causing the side members 15 to converge toward one end. These cross bars 13 and 14 are apertured for the passage therethrough of the bolts 9, the short cross bar 14 having an elongated opening 16 to receive the wings or extensions 9′ on said bolts. These yokes 12 are designed to fit over the arms formed at opposite sides of each ring by two sectional arms 6, 6 and 7, 7 on the meeting faces of the ring sections 3 and 4, the short cross bar 13 of each yoke being arranged to extend outwardly, and the longer cross bar 14, inwardly, as is shown clearly in Fig. 1, the side members of said yoke being adapted to engage the inclined faces of the wedge like arms. The bolts 9 are then passed through the elongated openings 16 in the short cross bars 13 of the yokes 12 of ring 2, through the openings formed by the registering notches 8 in the adjacent faces of the arms on the adjacent sections of the ring, and through the cross bars 14, and then through the longer cross bars of the yokes 12 of the ring 1 through the recesses on the arms of said ring, then through the elongated slots or openings in the short cross bars of the yokes of said ring 1. When in this position, the nuts 9′ are applied. When these nuts are tightened, it will be obvious that the yokes 12 on the two rings will be moved inwardly toward each other, thereby forcing the arms of the two sections of each ring into closer engagement for compressing the packing rings 17 laterally. These packings are arranged at the opposite ends of the sleeve or ring member C between the squared ends of said member and the shoulders 5 of the rings 1 and 2. The continued tightening of these nuts 9′ forces the rings 1 and 2 inwardly toward each other, and thus presses the packings 17 longitudinally relative to the pipe sections to which the device is applied. Thus it will be obvious that when the nuts 9′ are tightened on the bolts 9, the packing rings 17 will be compressed both transversely and longitudinally relative to the pipe sections or pipe to which the device is applied, and a fluid tight joint at the ends of the sleeve insured. It is important that the ends of the sleeve, in connection with which this device is used, be squared, in order that the packing rings 17 employed in combination therewith may have a maximum amount of pressure exerted thereon in a longitudinal direction relatively to the pipe to which they are applied.

In Fig. 11, this combination lock coupling is shown applied to the meeting ends of two pipe sections A′ and B′ which are disposed at a slight angle relatively to each other, and in connection with which, a sleeve $C^1$ is used, having an annular bead or centering stop $C^2$ arranged intermediately of its ends on its inner face, and against which the ends of the pipe sections to be connected are designed to engage, to properly position them within said sleeve. The lock coupling employed in this application of the invention is the same as that above described and after the parts have been assembled in the position shown in Fig. 11, the nuts 9′ are tightened to draw the rings toward each other and the sections of each ring together, whereby the packing rings 17 disposed at each end of the sleeve $C^1$ are compressed both transversely and longitudinally relative to the sleeve $C^1$ and fluid tight joints formed at these points. It will be obvious that the compressing strains exerted by the bolts and yokes are directed in planes at right angles to each other.

In the form illustrated in Fig. 12, the coupling is shown applied to a pipe P having a transverse break therein, the parts of the pipe being designed to be connected with their adjacent ends spaced slightly apart to provide for the closing of the leak caused by the breakage of the pipe without shortening the length thereof. A sleeve $C^3$ is disposed around the meeting ends of this broken pipe and is similar in construction to the sleeve C, described in Figs. 1 to 10, except that it is here shown enlarged or shouldered at its opposite ends, otherwise the connection thereof by the rings 1 and 2 is the same.

In the form shown in Figs. 13 and 14, the coupling is shown applied to a pipe P′ having an opening O in one wall thereof. To close this opening and prevent leakage in the pipe, a sectional sleeve $C^4$ is employed, said sleeve being divided longitudinally into two sections, which are clamped around the pipe and provided at their meeting edges with suitable packings 18 the opposite ends of said sleeve being squared and having arranged thereon the packing rings 17 disposed between said ends and the shoulders 5 of the oppositely disposed coupling rings 1 and 2, and between which the packing rings are pressed by tightening the nuts 9′ on bolts 9, in a manner similar to that described above.

It will be observed that in all of the uses of my invention the packing rings or members are under both longitudinal and transverse compression when the parts of the coupling are tightened. This necessitates the use of packing rings of greater thickness than the depth of the shoulders in the sections of the rings or clamp members, so that when the bolts are tightened the packing rings will be compressed in both directions as has been hereinbefore fully set forth.

From the above description, it will be obvious that this improved combination lock coupling may be employed for a variety of purposes without changing the structure thereof. It will be obvious that these yokes 12 which encircle the two arms of adjacent sections will hold these arms together against accidental separation after the bolts 9 have been removed, and thus prevent the parts of the coupling from falling apart during the insertion and removal of the bolts.

I claim as my invention:—

1. A combination lock coupling comprising in combination with a sleeve having packings at its opposite ends, of shouldered split rings, and means for simultaneously drawing the sections of said rings together and moving said rings toward each other whereby the packings are compressed in planes at right angles to each other.

2. A combination lock coupling comprising in combination with a sleeve having squared ends, with packings on said ends, of shouldered split rings adapted to encircle said sleeve and packings, the shoulders engaging the packings, and coöperating yokes and bolts engaging said rings to simultaneously draw the sections of said rings together and to move said rings toward each other.

3. A combination lock coupling comprising two rings, each constructed of coöperating sections, each section having an arm extending laterally outward from each end with the meeting faces of the arms of adjacent sections provided with registering recesses, a shoulder on the inner face of each section spaced from one edge thereof, the shoulders of the sections being positioned to register or aline to form a continuous annular shoulder when the sections are assembled, yokes constructed to engage the arms of adjacent sections, bolts adapted to pass through yokes and arms on both rings, and means for coöperating with said bolts to draw said rings toward each other.

4. A combination lock coupling comprising two rings each constructed of coöperating sections, each section having an arm extending laterally outward from each end with the meeting faces of the arms of adjacent sections provided with registering recesses, a shoulder on the inner face of each section spaced from one edge thereof, the shoulders of the sections being positioned to register or aline to form a continuous annular shoulder when the sections are assembled, yokes constructed to engage the arms of adjacent sections, bolts adapted to pass through yokes and arms on both rings, tightening nuts on said bolts, and coöperating means on said yokes and arms for forcing the ring sections together when the nuts are tightened.

5. A combination lock coupling comprising two rings, each constructed of coöperating sections, each section having an arm extending laterally outward from each end with the meeting faces of the arms of adjacent sections provided with registering recesses, a shoulder on the inner face of each section spaced from one edge thereof, the shoulders of the sections being positioned to register or aline to form a continuous annular shoulder when the sections are assembled, yokes constructed to engage the arms of adjacent sections, bolts adapted to pass through yokes and arms on both rings, tightening nuts on said bolts, and coöperating wedge faces on said yokes and arms for forcing the ring sections together when the nuts are tightened.

6. A combination lock coupling comprising two rings each constructed of coöperating sections, each section having an arm extending laterally outward from each end, a shoulder on the inner face of each section spaced from one edge thereof, the shoulders of the sections being positioned to aline to form a continuous annular shoulder when the sections are assembled, yokes for extending transversely of the two arms of adjacent sections and having side members converging toward one end, said arms having wedge faces for coöperation with said converging side members, and means for moving said yokes inwardly to draw the ring sections together.

7. A combination lock coupling comprising two rings each constructed of coöperating sections, each section having an arm extending laterally outward from each end, a shoulder on the inner face of each section spaced from one edge thereof, the shoulders of the sections being positioned to aline to form a continuous annular shoulder when the sections are assembled, yokes for extending transversely of the two arms of adjacent sections and having side members converging toward one end, said arms having wedge faces for coöperation with said converging side members, and bolts adapted to pass through said yokes and arms of each ring to move the yokes on both rings inwardly to draw the ring sections toward each other and to draw the rings toward each other.

8. A combination lock coupling comprising two rings each constructed of coöperating sections, each section having an arm extending laterally outward from each end, a shoulder on the inner face of each section spaced from one edge thereof, the shoulders of the sections being positioned to aline to form a continuous annular shoulder when the sections are assembled, yokes for extending transversely around the arms of adjacent sections and comprising side members connected at their opposite ends by apertured cross bars, one of said cross bars being longer than the other, and bolts adapted to pass through said arms and the apertures in said yokes, the arms having wedge faces for coöperation with the side bars of the yokes, and tightening nuts arranged on said bolts.

9. A combination lock coupling comprising split rings shouldered on their inner faces, the sections of said rings having arms extending laterally outward from the ends thereof, the meeting faces of the arms of adjacent sections having registering recesses or notches therein with lateral extensions at their opposite sides, bolts adapted to pass through the recesses in said arms and having lateral wings for engagement with the extensions of said recesses, and means for holding said sections against separation.

10. A combination lock coupling comprising split rings shouldered on their inner faces, the sections of said rings having arms extending laterally outward from the ends thereof, the meeting faces of the arms of adjacent sections having registering recesses or notches therein with lateral extensions at their opposite sides, bolts adapted to pass through the recesses in said arms, and having lateral wings for engagement with the extensions of said recesses, a yoke adapted to extend transversely around said arms and having apertures in the cross bars thereof, the aperture in one of said cross bars having oppositely disposed extensions or elongations to provide for the passage of the wings of said bolts.

In testimony whereof I have hereunto set my hand in presence of two subscribing witnesses.

DALTON U. POWELL.

Witnesses:
J. W. GRIESBAUR,
J. E. SCHRIDER.

---

Copies of this patent may be obtained for five cents each, by addressing the "Commissioner of Patents, Washington, D. C."